April 16, 1968   D. L. TELKAMP   3,378,742

SEEKING SWITCH MOTOR CONTROL SYSTEM

Filed July 15, 1964   2 Sheets-Sheet 1

INVENTOR.
DONALD L. TELKAMP
BY
Marvin Moody
ATTORNEY

April 16, 1968   D. L. TELKAMP   3,378,742
SEEKING SWITCH MOTOR CONTROL SYSTEM
Filed July 15, 1964   2 Sheets-Sheet 2

INVENTOR.
DONALD L. TELKAMP
BY Marvin Moody
ATTORNEY

United States Patent Office 3,378,742
Patented Apr. 16, 1968

3,378,742
SEEKING SWITCH MOTOR CONTROL SYSTEM
Donald L. Telkamp, Dallas, Tex., assignor to Collins Radio Company, Cedar Rapids, Iowa, a corporation of Iowa
Filed July 15, 1964, Ser. No. 382,737
18 Claims. (Cl. 318—33)

ABSTRACT OF THE DISCLOSURE

This invention describes a circuit for accurately controlling the angular position of a shaft by means of an electrical motor control circuit. The circuit includes a seeking switch, the rotor of which is constrained to rotation with the motor shaft. The switch is connected in the circuit controlling motor energization. The inventive motor control circuit is capable of both controlling energization of a reversible motor and sensing the direction of operation necessary for the motor shaft to reach the desired angular position.

---

This invention relates to a motor control system and more particularly to an electrical system for accurately positioning a shaft or the like by means of a reversible motor.

It is oftentimes desirable to accurately control the angular position of a shaft by means of an electrical motor control circuit. Such a circuit commonly includes a seeking switch the rotor of which is constrained to rotation with the motor shaft, which switch is, of course, connected in the circuit controlling motor energization.

It is therefore an object of this invention to provide an improved motor control circuit capable of accurately controlling the angular position of a shaft or the like.

It is another object of this invention to provide an improved electrical system that is relatively simple yet dependable for use in controlling a reversible motor.

It is still another object of this invention to provide an improved motor control circuit that is capable of both controlling energization of a reversible motor and sensing the direction of operation necessary for the motor shaft to reach the desired angular position.

It is yet another object of this invention to provide an electrical system for an automatic positioning circuit, which circuit may be remotely controlled.

It is still another object of this invention to provide a relatively simple electrical circuit for a shaft positioning system that includes a seeking switch and a plurality of remotely situated two-position switches, said two-position switches controlling a pair of relays one of which determines the energization of the motor to be controlled and the other of which controls the direction of operation of said motor.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiment of the herein disclosed invention may be included as come within the scope of the claims.

The accompanying drawings illustrate three complete examples of the embodiment of the invention constructed according to the best mode so far devised for the practical application of the principles thereof, and in which.

Figure 1:
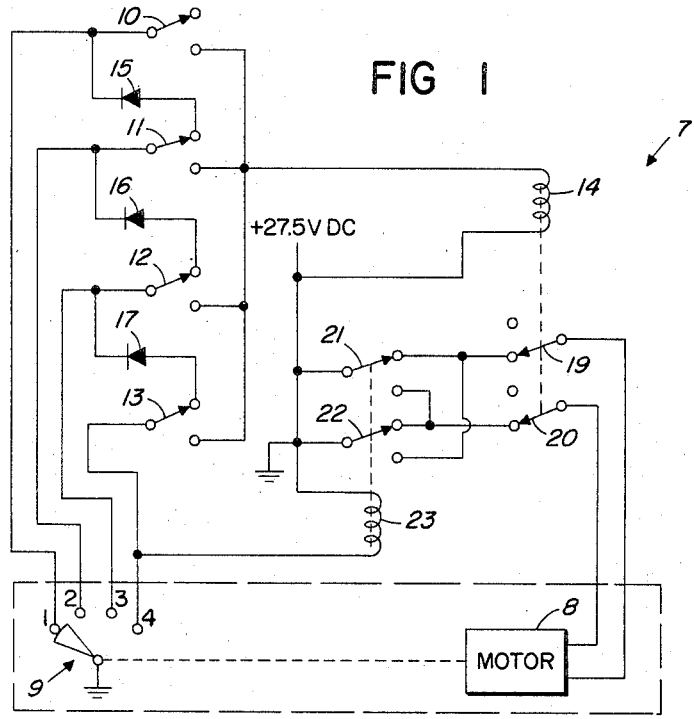
FIGURE 1 is a schematic diagram of one embodiment of the motor control system of this invention.

Referring now to the drawings in which like numerals have been used for like characters throughout, the numeral 7 indicates generally the electrical system of this invention shown connected to a reversible D.C. motor 8. The drive, or motor, shaft of motor 8 is operatively connected to the rotor of seeking switch 9. It is to be realized, of course, that the drive shaft of motor 8 is commonly also connected, directly or through a gear arrangement, to a shaft to be accurately positioned, which shaft could, for example, be carrying a tuning condenser.

As shown in FIGURE 1, each stationary contact of seeking switch 9 (designated 1 through 4 in the drawings) is connected to a different movable contactor of double-throw switches 10, 11, 12, and 13. One of the stationary contacts of each of the double-throw switches 10, 11, 12, and 13 is connected to one side of relay winding 14, the other side of which winding is connected to a +27.5 D.C. volt power supply (not shown). In addition, the other stationary contact of switch 11 is connected through diode 15 to the movable contactor of stationary switch 10, the other stationary contact of switch 12 is connected through diode 16 to the movable contactor of switch 11, and the other stationary contact at switch 13 is connected through diode 17 to the movable contractor of switch 12.

Relay winding 14 controls actuation of relay actuated switches 19 and 20, the movable contactors of which are connected to opposite sides of motor 8. One stationary contact of each switch 19 and 20 is connected to the stationary contacts of relay actuated switches 21 and 22, which switches are controlled by reversing relay winding 23. One side of relay winding 23 is connected to the +27.5 D.C. volt power supply while the other side of winding 23 is connected to stationary contact 4 of seeking switch 9. In addition, the movable contactor of switch 21 is likewise connected to the +27.5 D.C. volt power supply, while the movable contactor of switch 22 is connected to ground. As can be seen from FIGURE 1, the position of the movable contacts of switches 21 and 22 are such that when in the relay actuated position, motor energization is in one direction while in the normal position, motor operation is caused to be in the opposite direction.

In operation, the circuit as shown in FIGURE 1 operates in the following manner. If switch 13, for example, is closed (moved from the position shown in FIGURE 1 to the opposite position), the motor shaft of motor 8 will rotate clockwise until the rotor of seeking switch 9 reaches position 4. When this position is reached, a ground is supplied through seeking switch 9 and switch 13 to relay winding 14 to energize the same and cause relay actuated switches 19 and 20 to move to their relay actuated positions (opposite that shown in FIGURE 1) thus removing the power from motor 8. At the same time a ground is supplied through seeking switch 9 to relay winding 23 to actuate switches 21 and 22 and change the direction of power to the motor, thus tending to make the motor shaft rotate counterclockwise (but the motor is de-energized at the same time by switches 19 and 20).

At a later time, if switch 13 should be opened and switch 11 closed, for example, relay winding 14 will be de-energized, and switches 19 and 20 will reassume their normal, or closed positions (as shown in FIGURE 1) and thus reapply power to motor 8.

Relay winding 23, however, will remain energized. While the movable contactor (carried on the rotor of seeking switch 9) is in contact with stationary contact 4 of seeking switch 9, a ground is supplied to the relay winding. When the movable contactor makes contact with stationary contactor 3 of switch 9, the ground is still coupled to relay winding 23 (through diode 17 and switch 13).

It is also to be noted that the rotor of seeking switch 9 is elongated at the foot so that seeking switch 9 is a make-before-break type of switch. This means that the movable contactor engages the adjacent stationary contact before breaking contact with the prior engaged stationary contact. Thus, it can be readily seen that relay winding 23, if energized, is maintained energized during all movement of the rotor of switch 9 (thus the relay winding is maintained energized whenever the motor shaft turns counterclockwise as shown in the drawings). When the rotor of seeking switch 9 reaches position 2, ground will be supplied to relay winding 14 to energize the same and actuate switches 19 and 20 to remove the power from the motor 8.

Figure 2:
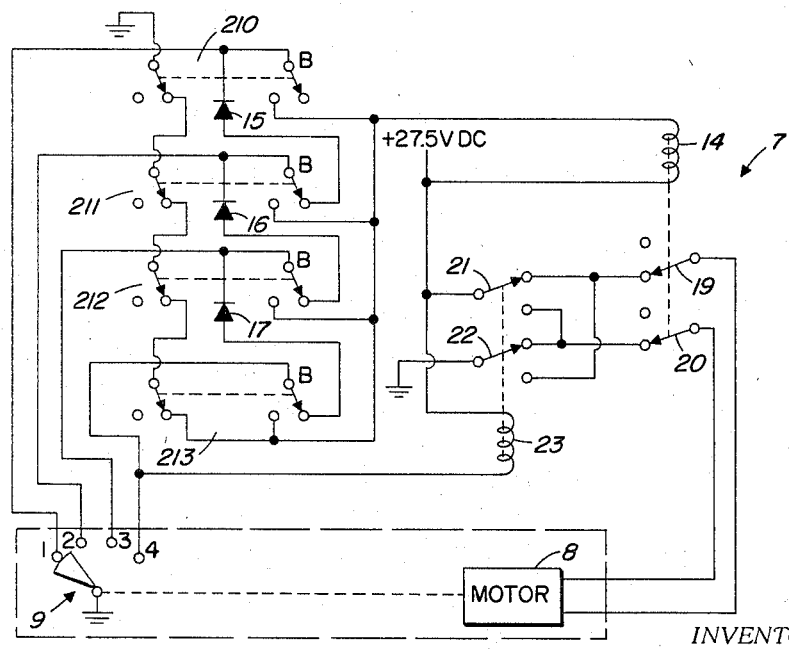
FIGURE 2 is a schematic diagram of a second embodiment of the motor control system of this invention.

In the embodiment of the invention shown in FIGURE 2, the circuitry is exactly the same as that described with respect to FIGURE 1 with the exception that switches 10, 11, 12, and 13 have been replaced by double-throw switches 210, 211, 212, and 213. The main portion of switches 210 to 213 (designated B as shown in FIGURE 2) is exactly the same as that described hereinabove with respect to switches 10 through 13 and the connections thereto are identical and need not be explained further herein. The auxiliary portion of each of switches 210 through 213 has a stationary contact that operates in conjunction with the movable contact of the main portion. As shown in FIGURE 2, the movable contactor of the auxiliary portion of switch 210 is grounded while the stationary contact is connected to the movable contactor of the auxiliary portion of switch 211. In like manner, one of the stationary contacts of the auxiliary portion of switch 211 is connected to the movable contactor of the auxiliary portion of switch 212 and one of the stationary contacts of the auxiliary portion of switch 212 is connected to the movable contact of the auxiliary portion of switch 213. In addition, one of the stationary contactors of the auxiliary portion of switch 213 is then connected to power relay winding 14.

The purpose of the auxiliary portion of switches 210 through 213 is to avoid hunting by the motor which can occur without the auxiliary portions of the switches if the main portions of all four switches are left in the open position (as shown in FIGURES 1 and 2). If this occurs using the embodiment shown in FIGURE 2, a ground is immediately applied to the power relay winding 14 to remove the power from the motor.

The electrical system shown in FIGURE 2 thus operates exactly as the system shown in FIGURE 1 with the exception that if all switches 210 through 213 are in the open position, as shown in FIGURE 2, then a ground is applied through the auxiliary portion of the switches to remove the power from the motor and thus avoid hunting.

Figure 3:
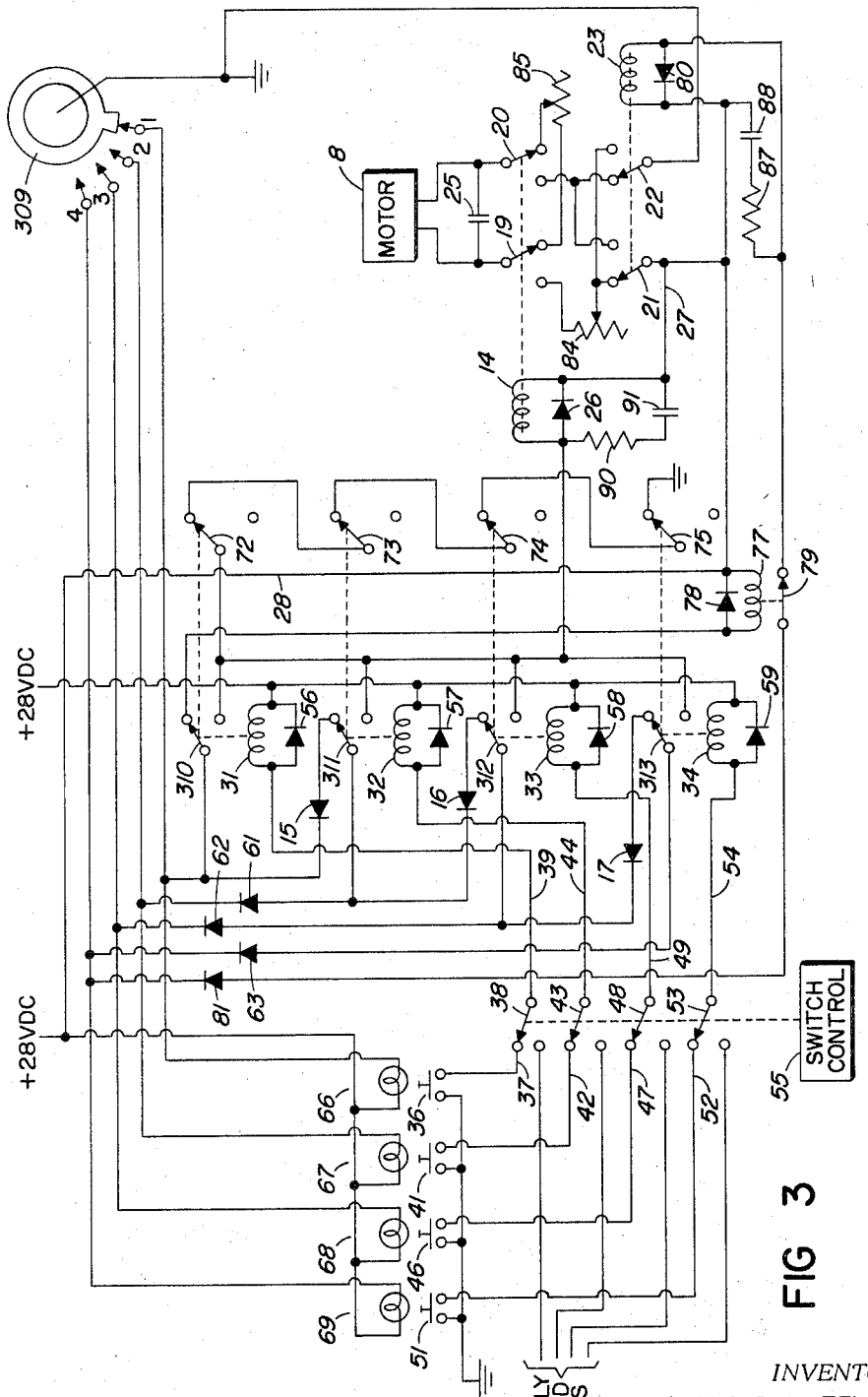
FIGURE 3 is a schematic diagram of the preferred embodiment of the motor control system of this invention.

In the embodiment of the invention shown in FIGURE 3, the same basic end is accomplished but with slightly different circuitry. In this embodiment, the make-before-break type of seeking switch is not used, the double-throw switches (10 through 13 as shown in FIGURE 1) are replaced by relay actuated switches that they may be remotely controlled, and indicator lamps are provided to indicate the position of the controlled shaft.

While a four-position seeking switch and four two-position switches are shown herein in the drawings, it is to be realized that this invention is not meant to be limited to this particular number of switches and/or positions and that any number could be provided as is necessary without departing from the intended scope of the invention. A twelve-position seeking switch could be utilized, for example, along with twelve two-position switches or twelve remotely actuated switches.

In the embodiment shown in FIGURE 3, motor 8 is connected to relay actuated switches 19 and 20 in the same manner as described hereinabove with respect to the embodiment shown in FIGURE 1. A capacitor 25 has been added between the movable contactors of relay actuated switches 19 and 20, however, for noise suppression purposes.

Relay winding 14 controls actuation of relay actuated switches 19 and 20. In the embodiment shown in FIGURE 3, a diode 26 has been connected across the opposite ends of relay winding 14 for purposes of spike suppression (a diode has been added across all relay windings for this purpose). As was true in the embodiment in FIGURE 1, relay winding 14, as shown in FIGURE 3, has one end connected to the +28 volt D.C. power supply through leads 27 and 28. The other end of relay winding 14 is connected to one of the stationary contacts of relay actuated switches 310, 311, 312, and 313.

Relay actuated switches 310 through 313 are comparable to switches 10 through 13 (shown in FIGURE 1) with one stationary contact of switch 311 connected through diode 15 to the movable contactor of switch 310, one stationary contact of switch 312 connected diode 16 to the movable contactor of switch 311, and one stationary contact of switch 313 connected through diode 17 to the movable contactor of switch 312.

Switches 310 through 313 are relay actuated by means of relay windings 31, 32, 33, and 34, respectively. Each of these relay windings are double form "C" relays that are programmable from peripheral equipment. Programming is achieved by merely applying a ground to the relay winding desired to be energized. As shown in FIGURE 3, a ground is coupled to relay winding 31 through push-button switch 36, lead 37, switch 38 and lead 39, a ground is coupled to relay winding 32 through push-button switch 41, lead 42, switch 43 and lead 44, a ground is coupled to relay winding 33 through push-button switch 46, lead 47, switch 48, and lead 49, and a ground is coupled to relay winding 34 through push-button 51, lead 52, switch 53, and lead 54.

Switches 38, 43, 48, and 53 are manually controlled switches for either manual or automatic operation, which switches are operable in unison by means of a conventional switch control 55. Each of the relays 31 through 34 has a diode (56, 57, 58, and 59, respectively) thereacross for spike suppression purposes, and the other end of each relay winding is connected to the +28 volt power supply.

The movable contactor of switch 310 is connected to stationary contact 1 of seeking switch 309. It is to be noted that seeking switch 309 is not a make-before-break type of switch. In like matter, the movable contactor of switch 311 is connected to stationary contact 2 of seeking switch 309, the movable contactor of switch 312 is connected to stationary contact 3 of seeking switch 309, and the movable contactor of switch 313 is connected to stationary contact 4 of seeking switch 309. The movable contactors of switches 311 through 313 are connected to the stationary contacts of switch 309 through diodes 61, 62, and 63 respectively. These diodes serve to prevent current flow to the indicating lights associated with positions other than the one directly connected to each said stationary contact of switch 309.

One side of each of the indicator lamps 66, 67, 68, and 69 is connected to the +28 volt power supply. The other side of lamp 66 is connected to the movable contactor of switch 310, the other side of lamp 67 is connected to the movable contactor of switch 311, the other side of lamp 68 is connected to the movable contactor of switch 312, and the other side of lamp 69 is connected to the movable contactor 313. By being so connected, each lamp is on only during the period when the movable contactor of switch 309 is in engagement with the stationary contact to which that lamp is connected (a ground is supplied at that time to the lamp through the seeking switch).

As shown in FIGURE 3, switches 310, 311, 312, and 313 are constrained to movement with auxiliary switches 72, 73, 74, and 75 respectively. The movable contactor of switch 72 is connected to one of the stationary contacts of switch 310 and the stationary contact of switch 72 is connected to the movable contactor of switch 73. In like manner, the stationary contact of switch 73 is connected to the movable contactor of switch 74 and the stationary contact of switch 74 is connected to the movable conactor of switch 75. The stationary contact of switch 75 is then, in turn, connected to ground. It is the purpose of switches 72 through 75 to provide a ground for power relay winding 14 whenever all of the relays 31 through 34 are de-energized. This, of course, is comparable to the purpose of the auxiliary portion of switches 210 through 213 shown in FIGURE 2.

The other stationary contact of switch 310 is connected to one side of relay winding 77, which relay winding has a diode 78 thereacross for spike suppression purposes. The other side of relay winding 77 is connected to the +28 volt power supply through lead 28. Relay winding 77 controls relay actuated switch 79. One stationary contact to switch 79 is connected to one side of reversing relay winding 23 (which relay has a diode 80 thereacross), while the other end of reversing relay winding 23 is connected to the +28 volt power supply through lead 28. The movable contactor of switch 79 is connected to stationary contact 4 of seeking switch 309 through diode 81.

Reversing relay winding 23 controls relay actuated switches 21 and 22. The stationary contacts of the switches are connected to the stationary contacts of the power actuated switches 19 and 20 in the same manner as is described hereinabove with respect to the embodiments shown in FIGURES 1 and 2. In addition, a variable resistor 84 has been added between one of the stationary contacts from switch 19 and one of the stationary contacts of switches 21 and 22 so that the speed of motor 8 can be varied. A second resistor 85 has also been added between the other stationary contact of switch 19 and one stationary contact switch 20 to provide braking.

Since seeking switch 309 is not a make-before-break type of seeking switch, a delay network consisting of serially connected resistor 87 and capacitor 88 is connected across reversing relay winding 23 to keep the relay winding energized while the rotor of seeking switch 309 is being moved from one position to the next when the motor is turning counterclockwise. In addition, a delay network offering a longer delay is connected across relay winding 14. This delay circuit consists of serially connected resistor 90 and capacitor 91, and allows the direction of a rotation of the motor to be determined before power is supplied to the motor (by switches 19 and 20 closing).

In operation, the electrical system of FIGURE 3 operates essentially in the same manner as that shown in FIGURE 1. When one of the remote push buttons 36, 41, 46, or 51 is depressed to supply a ground to its associated relay winding, the associated relay actuated switch (310, 311, 312, or 313) is closed. The motor shaft of motor 8 will turn in the direction necessary to turn the rotor of seeking switch 309 until a ground is applied to the power relay winding 14 to de-energize the motor. This same ground will cause the indicator lamp to burn and thus show the position of the shaft. When the motor is turning counterclockwise, reversing relay winding 23 is maintained energized by the delay circuit across the winding during the time when the rotor is between positions.

When the movable contactor on the rotor is in contact with one of the stationary contacts (and the motor is turning in a counterclockwise direction) the ground is maintained on reversing relay winding 23 through the diodes interconnecting switches 310 through 313 in the same manner as described hereinabove with respect to the embodiment of FIGURES 1 and 2. When the rotor of seeking switch 309 is turning in the clockwise direction of course, reversing relay winding 23 is de-energized and hence no circuit need be maintained.

In view of the foregoing it should be obvious to those skilled in the art that the control system of this invention combines simple structure with dependable means for accurately controlling energization and direction of operation of a reversible motor and thus makes the system particularly well suited for controlling the angular position of a shaft.

What is claimed as my invention is:

1. A motor control system, comprising: a reversible motor having a rotatable motor shaft; seeking switch means having a plurality of stationary contacts and a rotor, said rotor being constrained to rotation with said motor shaft and rotation of said rotor causing said stationary contacts to be successively grounded; a motor energization circuit including first and second switch means; and a control circuit including first and second switch actuation means for controlling actuation of said first and second switch means, third switch means connected at least between said seeking switch means and said first switch actuation means for causing said first switch actuation means to open said first switch means when said motor shaft reaches a predetermined angular position, said third switch means including a plurality of individually operable switches and means connected to said third switch means and to said seeking switch means for sensing the direction of motor operation necessary for said motor shaft to reach said predetermined angular position and causing said motor to be operated in said direction.

2. The motor control system of claim 1 wherein said seeking switch means is a make-before-break type of seeking switch.

3. The motor control system of claim 1 wherein said first and second switch actuation means are relay windings having a delay circuit connected in parallel therewith, said delay circuit connected across said second switch actuation means causing said winding, if energized, to remain energized while said rotor of said seeking switch means moves from one stationary contact to the next.

4. The motor control system of claim 3 wherein said plurality of individually operable switches is a plurality of two-position switches and wherein said last named means includes a plurality of diodes connecting said switches together for current flow in one direction to maintain said second relay winding energized while the rotor of said seeking switch moves from one stationary contact to the next.

5. The motor control system of claim 4 wherein said two-position switches are single-pole double-throw switches.

6. The motor control system of claim 4 wherein said two-position switches are double-pole double-throw switches.

7. The motor control system of claim 4 further characterized by a plurality of remotely situated switches equal in number to the number of said two-position switches; and further characterized by a plurality of relay windings equal in number to the number of said two-position switches, each said remotely situated switch, when closed, being connected to energize a different one of said relay windings and thereby control actuation of said two-position switches.

8. The motor control system of claim 7 wherein each of said relay windings has a diode connected thereacross for spike suppression purposes.

9. The motor control system of claim 1 further characterized by indicator lamps connected to said stationary contacts of said seeking switch means for positively indicating the angular position of said motor shaft.

10. A motor control system, comprising: a reversible motor having a rotatable motor shaft; seeking switch means having a plurality of stationary contacts and a rotor, said rotor being constrained to rotation with said motor shaft and rotation of said rotor causing said stationary contacts to be successively grounded; a motor energization circuit including first and second relay actuated switch means; and a control circuit including first and second relay windings for controlling actuation of said first and second relay actuated switch means said relay actuated switch means being closed only when said relay winding associated therewith is energized, a plurality of two-position switches connected at least between said first relay winding and said seeking switch means for causing said first relay winding to be de-energized to open said first relay actuated switch means when said motor shaft reaches a predetermined angular position, and a plurality of diodes interconnecting said two-position switches for causing said motor to be operated in the proper direction for said motor shaft to reach said predetermined angular position.

11. The motor control system of claim 10 wherein said seeking switch means is a make-before-break type of seeking switch.

12. The motor control system of claim 10 wherein said second relay winding has a delay circuit thereacross to prevent de-energization of said second relay winding, if energized, during the movement of said rotor of said seeking switch between stationary contacts.

13. The motor control system of claim 10 wherein said two-position switches are double-pole double-throw switches preventing hunting by said rotor of said seeking switch means whenever all of said two-position switches are in an open position.

14. A motor control system, comprising: a reversible motor having a rotatable motor shaft; a multiposition switch having a plurality of stationary contacts and a rotor, said rotor being constrained to rotation along with said motor shaft and rotation of said rotor causing said stationary contacts to be successively grounded, said multiposition switch having an elongated movable contactor so that the next adjacent stationary contact is engaged before engagement is terminated with the prior engaged stationary contact; a motor energization circuit including first and second relay actuated switch means; and a control circuit including power and reversing relay windings, the energization of said power relay winding terminating power to said motor and the energization of said reversing relay winding reversing the direction of motor operation, said control circuit also including a plurality of double-throw switches equal in number to the number of preselected angular stopping positions of said motor and to the number of stationary contacts of said multiposition switch, each said double-throw switch having an open position and a closed position in which said power relay winding is connected to one of the stationary contacts of said multiposition switch, each said double-throw switch being connected to an adjacent double-throw switch by means of a diode whenever said switch is in the open position whereby said reversing relay winding, if energized, is maintained energized while the rotor of said multiposition switch is being rotated to the desired angular position as determined by the particular double-throw switch that is in a closed position.

15. The motor control circuit of claim 14 wherein said double-throw switches are double-pole double-throw switches two poles of which are connected together in series with the like connected poles of adjacent double-throw switches to ground said power relay winding when said double-pole double-throw switches are all in the open position to prevent hunting by the motor.

16. A motor control circuit, comprising: a reversible motor having a rotatable motor shaft; a seeking switch having $n$ stationary contacts and a rotor with a movable contactor thereon constrained to rotation with said motor shaft, rotation of said rotor causing said movable contactor to successively and exclusively engage said stationary contacts; a motor energization network having first and second relay actuated switches therein; a first relay winding for controlling the actuation of said first relay actuated switch between an energized closed position and a de-energized open position; a second relay winding for controlling the actuation of said second relay actuated switch between an energized closed position and a de-energized open position; $n$ selecting switches each of which is connected to a different one of said $n$ stationary contacts of said seeking switch and to said first relay winding when said selecting switch is in the closed position, said selecting switch supplying a ground to energize said first relay winding when said stationary contact connected thereto engages the movable contactor of said seeking switch; $n$ selecting switch relay windings; $n$ remotely situated switches each of which is connected to a different one of said switch relay windings to control actuation of said selecting switches; a diode connecting each said selecting switch with an adjacent switch so that a current path is established in one direction to hold said second relay winding energized while said motor is turning in one direction; and a delay circuit connected across both said first and second relay windings to maintain the energized state of said relay while said rotor of said seeking switch is out of contact with all stationary contacts during rotation.

17. The motor control circuit of claim 16 further characterized by $n$ auxiliary switches connected in series to ground said first relay winding when all said selecting switches are open, each said auxiliary switch being constrained to movement with a different one of said selecting switches.

18. The motor control circuit of claim 16 further characterized by $n$ indicating lights connected to a different one of each of said $n$ stationary contacts of said seeking switch to indicate the angular position of said motor shaft.

References Cited
UNITED STATES PATENTS

| | | | |
|---|---|---|---|
| 2,431,408 | 11/1947 | MacSorley | 318—33 |
| 2,698,409 | 12/1954 | Sherwood | 318—33 |
| 2,958,028 | 10/1960 | Smith | 318—467 |
| 3,001,118 | 9/1961 | Goetz | 318—467 |
| 3,256,473 | 6/1966 | Simopoulos et al. | 318—33 |

ORIS L. RADER, *Primary Examiner.*

T. LYNCH, *Examiner.*